United States Patent [19]

Owens

[11] 3,916,970
[45] Nov. 4, 1975

[54] DEFORMABLE BEAD RETAINING MEMBERS

[75] Inventor: Geoffrey Lloyd Owens, Sutton Coldfield, England

[73] Assignee: Dunlop Limited, London, England

[22] Filed: Feb. 16, 1973

[21] Appl. No.: 333,381

[30] Foreign Application Priority Data
Feb. 22, 1972 United Kingdom............... 08024/72

[52] U.S. Cl. ................. 152/379.1; 85/70; 152/381; 152/384; 152/399; 152/415; 152/427
[51] Int. Cl.².. B60C 5/16; B60C 7/26; B60C 15/02; B60C 29/00
[58] Field of Search ...... 85/70, 71; 152/362 R, 386, 152/398, 415, 378, 379.1, 381, 384, 387, 427

[56] References Cited
UNITED STATES PATENTS

| | | |
|---|---|---|
| 1,939,935 | 12/1933 | Wagenhorst ............... 152/362 R X |
| 2,255,650 | 9/1941 | Burke .................. 85/71 X |
| 2,400,969 | 5/1946 | Baker................... 152/415 |
| 2,562,019 | 6/1951 | Colley.................... 85/70 |
| 2,887,926 | 5/1959 | Edwards ................ 85/70 |
| 3,230,818 | 1/1966 | Siebol .................... 85/71 |
| 3,669,174 | 5/1972 | Mills.............. 152/386 X |
| 3,765,469 | 10/1973 | LeJeune............ 152/415 |

Primary Examiner—M. Hensen Wood, Jr.
Assistant Examiner—Howard Beltran
Attorney, Agent, or Firm—Stevens, Davis, Miller & Mosher

[57] ABSTRACT

Wheel rim and tire assembly including at least one member for retaining the tire bead in position on the rim bead seat and against the rim flange. The bead retaining member is located in an aperture in the rim and comprises a flange and an expanded portion which retain the member in the aperture, the expanded portion engaging the tire bead to exert a retaining force thereon.

13 Claims, 12 Drawing Figures

DEFORMABLE BEAD RETAINING MEMBERS

This invention relates to pneumatic tire and wheel assemblies and particularly to methods and devices for preventing axial displacement of tyre beads.

When a pneumatic tire is punctured or otherwise deflated when in use, the beads of the tire become prone to axially inward displacement particularly when the tire is subjected to cornering forces. Such displacement can cause a loss of steering control and is of particular concern on wheels of the well-base type, as in extreme cases the tire beads can be displaced into the wheel rim well often resulting in serious damage to the tire walls and even the complete loss of the tire from the rim.

It is an object of the present invention to provide a method for preventing tire bead displacement in the event of a puncture or deflation of a pneumatic tire when in use, and further objects of the invention are to provide a wheel and tire assembly and a tire bead retaining member.

According to one aspect of the invention a wheel rim and tire assembly comprises a pneumatic tyre mounted on an associated rim and having at least one tire bead retaining member inserted from the exposed side of the rim through an aperture provided in the rim axially inboard of and adjacent the tire bead, the said member having a flange at the outer side of the rim and an expanded portion at the inner side of the rim relative to the tire/rim cavity and thereby being secured to the rim, the member serving to prevent axially inward displacement of the associated tire bead.

According to another aspect of the present invention a method for securing against axial displacement a bead of a pneumatic tire mounted in its normal position on an associated vehicle wheel rim comprises inserting a tire bead locating member from the exposed side of the rim through an aperture provided in the rim axially inboard of and adjacent the tire bead, the said member being formed with a flange so that its outer end will not pass through the aperture, and expanding a portion of the member within the tire/rim cavity thereby to secure the member to the rim, the member serving to prevent axially inward displacement of the associated tire bead.

Normally at least three tire bead locating members are required to be inserted in order to provide adequate security against tire bead displacement.

The tire bead retaining member may be constructed of metal, rubber or plastics, and may comprise means for maintaining the expanded portion of the member in the expanded state, a valve for the purpose of inflating the associate tire or a pipe by means of which fluid may be dispensed into the tire wheel cavity.

Several embodiments of the present invention will now be described by way of example with reference to the accompanying drawings of which FIG. 1 is a cross-sectional view through part of a wheel rim and a bead retaining member according to a first embodiment of the invention.

Figure 1:
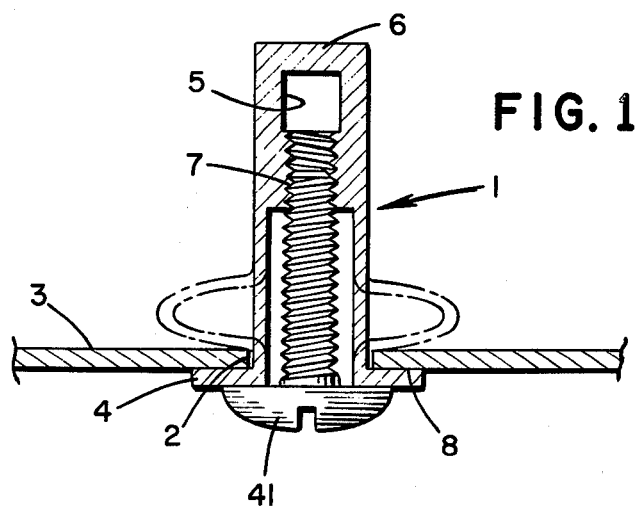

In a first embodiment, shown in FIG. 1 the tire bead retaining member 1 is of metal construction and of cylindrical form with a diameter such as to provide a clearance fit in an associated aperture 2 in a wheel rim 3. The member is provided with a flange 4 at its outer end having a diameter greater than the diameter of the aperture in the wheel rim, and the member is formed with a blind hole 5 extending axially through the member from its flanged outer end, the closed inner end 6 of the member being provided with a blind screw-threaded axial drilling 7. In operation, the retaining member is inserted through the aperture in the wheel rim after assembly of a tire on the rim, the position of the aperture in the rim being such that the retaining member lies axially inboard of and closely adjacent the inner surface of the associated tire bead in the tire/rim cavity.

Figure 2:
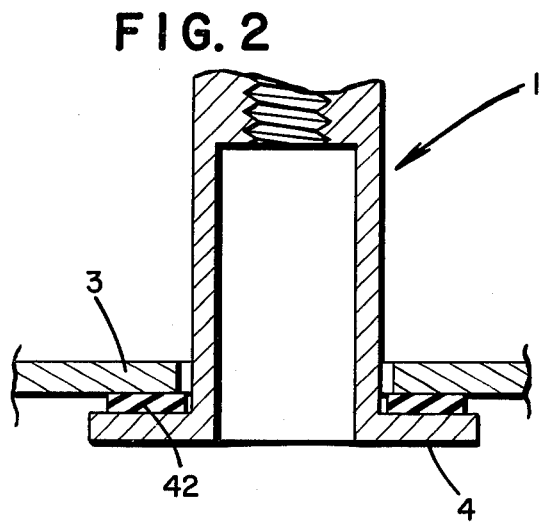
FIG. 2 is a cross-sectional view through part of a wheel rim and part of a bead retaining member showing a first modification to the first embodiment having a seal.
Figure 3:
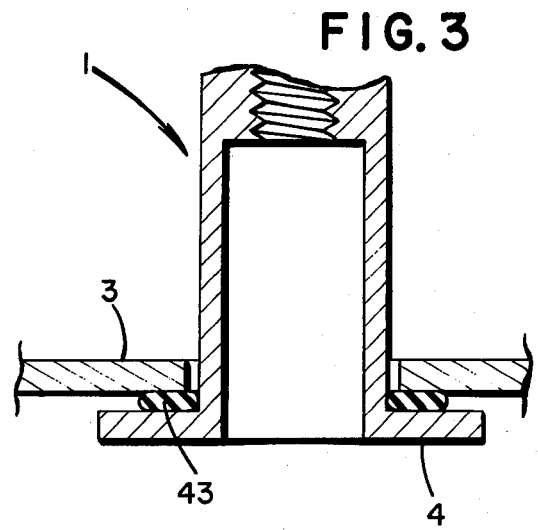
FIG. 3 is a cross-sectional view through part of a wheel rim and part of a bead retaining member showing a second modification to the first embodiment having a D-ring seal.
Figure 4:
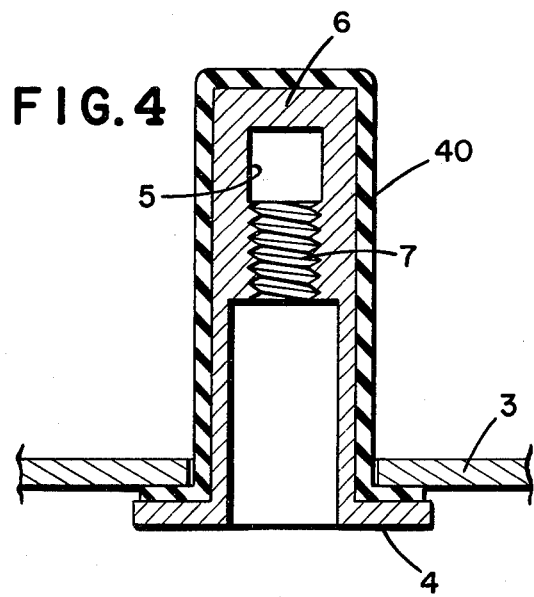
FIG. 4 is a cross-sectional view through part of a wheel rim and a bead retaining member showing a third modification to the first embodiment having a resilient covering.

An elongated element comprising a screw 41 is screwed into the axial drilling 7 of the retaining member 1, either before or after assembly of the member into the rim 3, and projects through the open outer end of the member to provide means for applying a tensile load to the closed end 6 of the member in order to expand the member radially and compress the member axially and once so expanded and compressed, to maintain it in this state. The tensile load is applied by screwing the bolt head against an abutment surface constituted by or associated with the flange 4 to produce a tensile strain in the member. The flange is thus held in position against the exposed surface 8 of the rim 3 and the axial compression of the portion of the member within the tire/rim cavity causes the walls of the member to collapse, spreading radially outwardly into a permanent expanded shape, shown in dotted outline, and thereby rigidly attaching the member to the wheel rim. To retain inflation pressure a metal-to-metal seal is provided between the rim and the member. Alternately an O-ring 43 as shown in FIG. 3 or other form of sealing washer 42 as shown in FIG. 2 may be placed between the flange 4 of the member 1 and the rim 3. In a further modification shown in FIG. 4, the retaining member is covered by a layer 40 of rubber or plastics material forming an improved seal with the rim.

Figure 5:
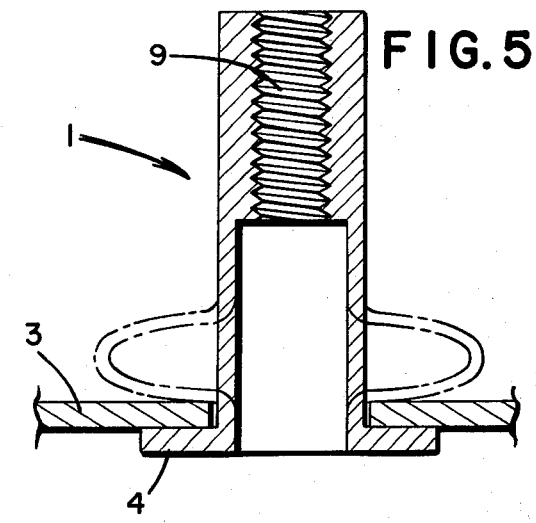
FIG. 5 is a cross-sectional view through part of a wheel rim and a bead retaining member showing a fourth modification to the first embodiment.

In a fourth modification shown in FIG. 5, the inner end of the retaining member is provided with a screw-threaded axial drilling 9 all the way through instead of the blind hole 1 drilling previously described and shown in FIG. 1. A seal (not shown) may be provided in the screw-threaded axial drilling 9 to prevent air leakage from the tire.

Figure 6:
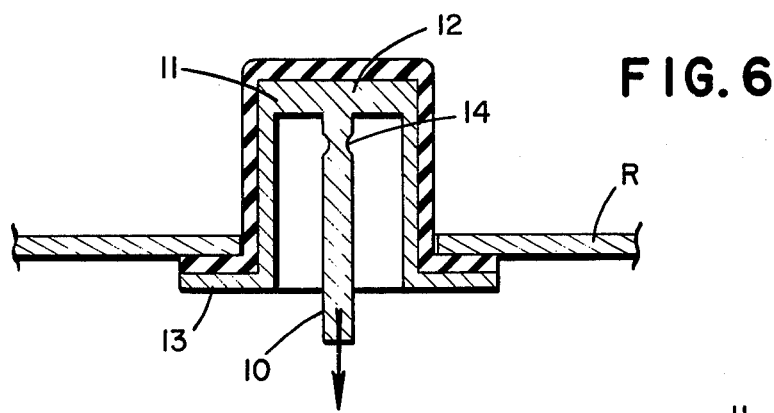
FIG. 6 is a cross-sectional view through part of a wheel rim and a bead retaining member according to a second embodiment of the invention having a resilient covering.
Figure 7:
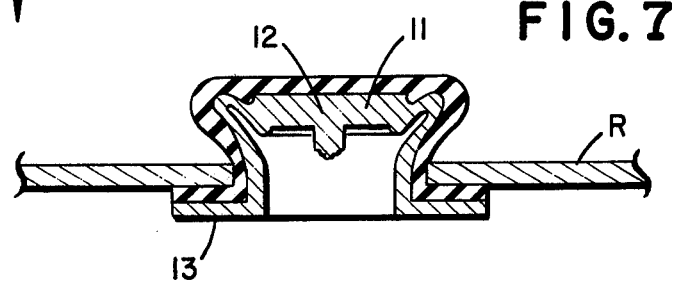
FIG. 7 is a cross-sectional view through part of a wheel rim and a bead retaining member as shown in FIG. 6 after deformation.

In a second embodiment of the invention, shown in FIGS. 6 and 7, a rod 10 forming an integral part of the member 11 extends from the inner end portion 12 to a position projecting well clear of the flanged end portion 13. The rod is provided with a point of reduced cross-section 14 to cause failure under a certain tensile load. After fitting the member into the aperture in the rim R FIGS. 6 and 7 a tensile force is applied to the rod causing deformation, i.e. radial expansion and axial compression, of the member as before, and when the deformation is complete the rod is arranged to break, leaving a small portion within the member as shown in FIG. 7.

In either of the embodiments described above the tire bead retaining member may be used on a specially constructed or modified rim provided with an axially inwardly extended bead seat portion to provide an adequate seating for the retaining member between the toe of the tire bead and the axially inner edge of the extended bead seat, or in some cases a standard rim may have bead seats of sufficient width to enable the member to be installed.

Figure 8:
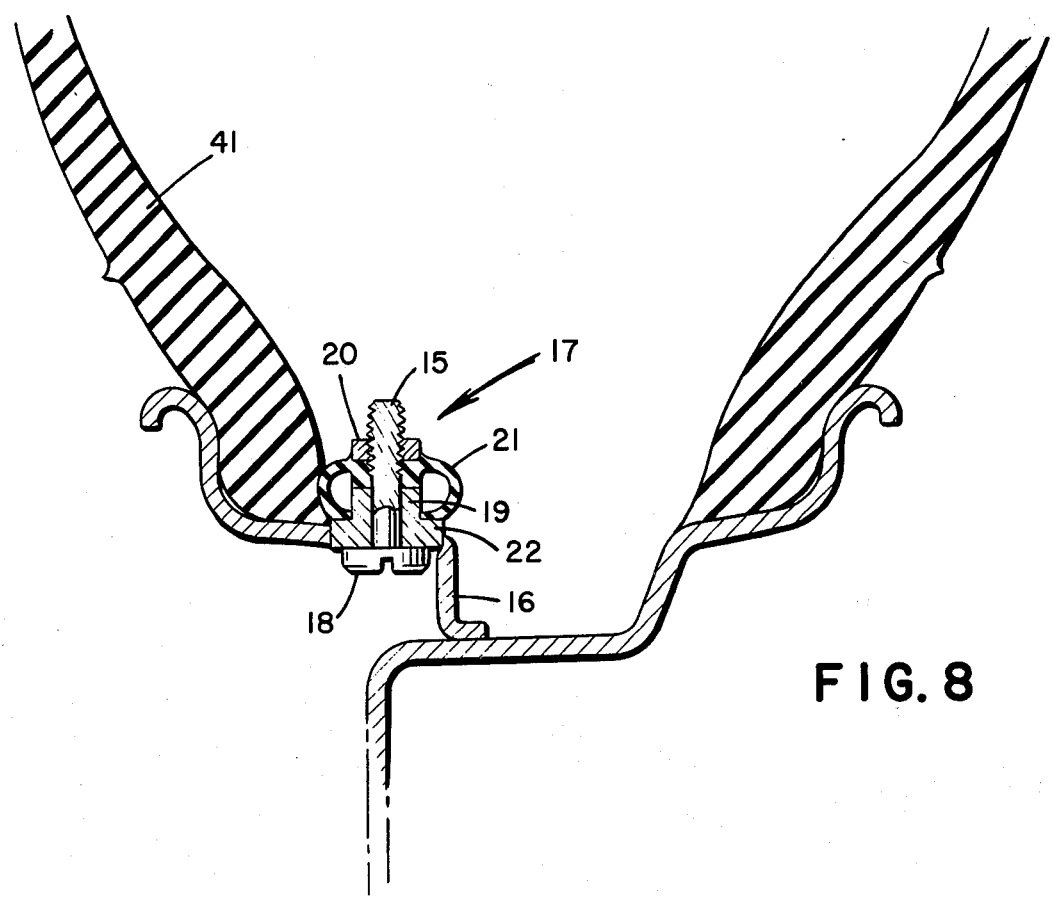
FIG. 8 is a cross-sectional view through a wheel rim, part of a tire, and a bead retaining member according to a third embodiment of the invention.

In a third embodiment, shown in FIG. 8, an aperture is formed in an extended bead seat portion of a rim 16 through which the bead retaining member 17 is inserted. The aperture is located in a boss 22 is welded to the rim alternatively the aperture may be formed in a depression formed in the rim. The tire bead retaining member includes a screw 15 which is threaded into a female portion consisting of a metal sleeve 19 and a nut 20. A rubber or plastic sleeve 21 surrounds the metal sleeve 19 and nut 20 and is either bonded or clamped at one end to the metal sleeve 19 and nut 20. The retaining member is inserted through the aperture into the wheel/rim cavity with the head 18 of the bolt or screw abutting the outer portion of the rim. On turning the bolt or screw to move it into the nut the rubber sleeve 21 is compressed axially and expanded radially thereby locking the tire bead 41 to the rim 16, and also forming a seal between the retaining member 17 and the tire/rim cavity. The metal sleeve 19 which is positioned between the head of the bolt 18 and the nut 20 serves to limit the travel of the nut and to provide rigidity and strength to the tire bead retaining member. In order to prevent the retaining member turning when a torque is applied to the bolt or screw, the aperture and retaining member may be of square cross-section, through circular or other forms of cross-section are acceptable.

Figure 9:
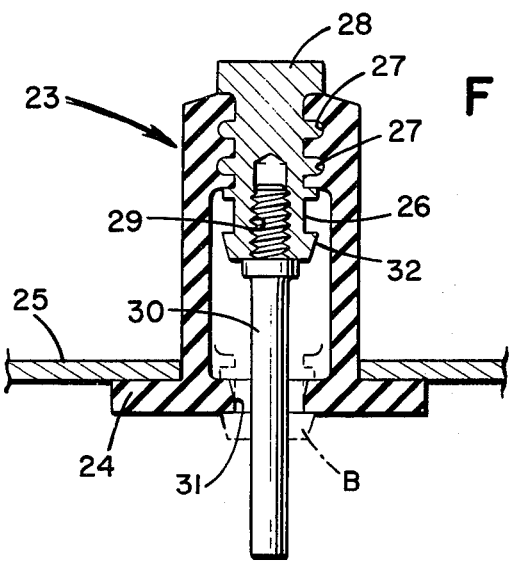
FIG. 9 is a cross-sectional view through part of a wheel rim and bead retaining member according to a fourth embodiment of the invention.

In a fourth embodiment of the invention (shown in FIG. 9) a tire bead retaining member comprises a tubular cylindrical rubber or plastics body 23 with a flange 24 at one end of greater external cross-section than the aperture provided in the wheel rim 25.

A passage extends axially through the center of the body 23 and has two portions of reduced cross-section, one at each end. The portion of reduced cross-section at the inner end of the body, i.e. remote from the flanged end, is formed with two circumferential grooves 27 by means of which an elongated element comprising a steel plunger 26 of circular cross-section and formed with two circumferential ribs which fit into the grooves 27, is located in the body. This rib and groove construction improves the mechanical bonding and sealing of the plunger to the body. The plunger is also provided with an enlarged head portion 28. The center of the plunger is provided with an axially screw-threaded blind hole 29 into which a threaded rod 30 engages. The rod 30 projects outwardly past the flanged end of the rubber body 23 to the exposed side of the rim.

The portion of reduced cross-section at the flanged end of the body forms a radially inwardly extending lip around a central hole 31 of smaller diameter than the main part of the passage through the body 23. The lip is chamfered on the side within the body. A tail portion of the plunger is provided with an enlarged shoulder 32 tapering in a similar fashion to the chamfered hole 3, allowing the tail portion of the plunger to be pulled past the lip by means of the rod, the non-tapered inner surface of the shoulder of the plunger 26 then abutting the outer face of the flange and preventing the plunger from returning. The rod may then be unscrewed. With the plunger 26 in this position (shown dotted and referenced B in FIG. 9) the rubber body 23 is compressed axially so the wall expands radially outwardly to grip and form a seal with the rim, thus locking the rubber member in a position where it prevents displacement of the tire bead.

Figure 10:
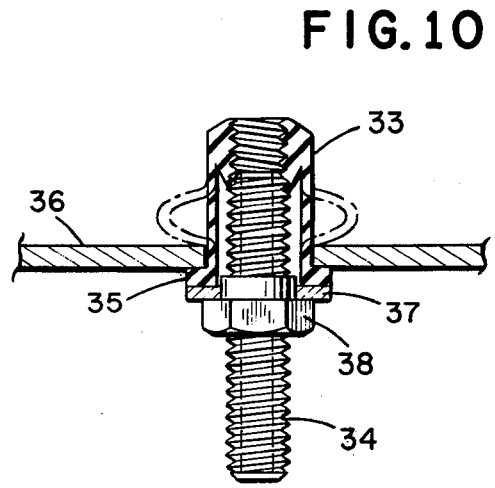
FIG. 10 is a cross-sectional view through part of a wheel rim and a bead retaining member according to a fifth embodiment of the invention having a valve.

In a fifth embodiment of the invention, shown in FIG. 10, a tire bead retaining member comprises a cylindrical rubber or plastics sleeve body 33 having an elongated element comprising an inflation valve body 34 bonded to one end of the sleeve and passing axially through its center to emerge from the other end of the sleeve which is provided with an enlarged flange 35.

Figure 11:
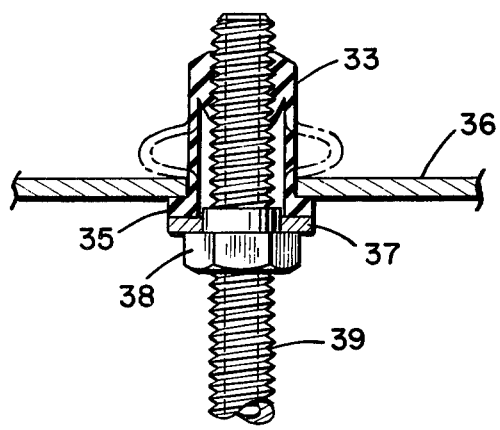
FIG. 11 is a cross-sectional view through part of a wheel rim and a bead retaining member showing a modification to the fifth embodiment having a conduit.

The sleeve is inserted through an aperture provided in the rim portion 36 of a vehicle wheel and its flange abuts the exposed face of the rim portion. A washer 37 is placed over the flange, and a locking nut 38 is screwed on to an external thread formed on the valve body 34. The locking nut is tightened down on to the washer pressing the flange 35 against the rim face and drawing the inner end of the rubber body towards the flange, causing the sleeve 33 to expand radially and thereby serving as a tire retaining member. In this embodiment the tire retaining member and the inflation valve are therefore provided by a single composite article. The valve body 34 may alternatively be replaced by a pipe 39 for dispensing lubricating fluid (as shown in FIG. 11) to a punctured or deflated tyre as described in the specification of our co-pending U.S. application Ser. No. 150,627, filed June 7, 1971.

Figure 12:
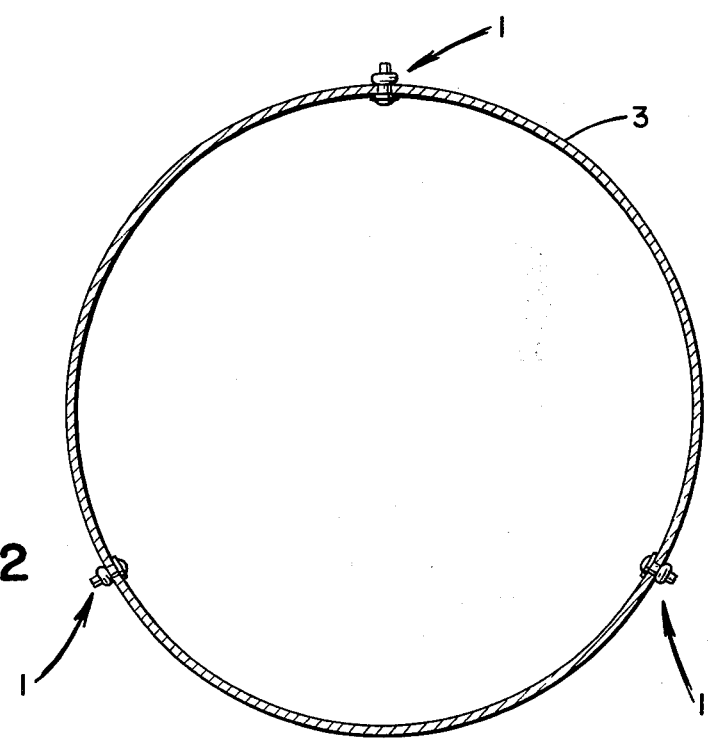
FIG. 12 is a cross-sectional view in a circumferential plane of a wheel rim having three bead retaining members according to the invention adjacent one bead seat.

It has been found that when a vehicle is cornering it is the axially outer tire beads of the tires on the side of the vehicle on the outside of the bend which are most likely to become displaced in the event of a puncture or deflation of a tire. It is therefore possible to retain a tire on a rim by providing three (see FIG. 12) or more tyre bead retaining members of the kind described above, positioned around the circumference of the bead seating portion of the axially outer side of the wheel rim only. For heavy duty use the tire bead retaining members are positioned around the circumference of the bead seating portion on both the axially inner and outer sides of the wheel rim.

Having now described my invention what I claim is:

1. A wheel rim and tire assembly comprising a pneumatic tire mounted on an associated rim and having at least one tire bead retaining member inserted from the exposed side of the rim through an aperture provided in the rim axially inboard of an adjacent the tire bead, the said member having a flange at the outer side of the rim relative to the cavity between the rim and tire and an expanded portion at the inner side of the rim relative to the cavity between rim and tire, the flange and expanded portion securing the member to the rim and the expanded portion engaging the associated tire bead to prevent axially inward displacement thereof.

2. A wheel rim and tire assembly according to claim 1 having at least one tire bead retaining member comprising means for maintaining the expanded portion in the expanded state.

3. A wheel rim and tire assembly according to claim 2 wherein the tire bead retaining member is of tubular construction and the means for maintaining the expanded portion in the expanded state comprises an elongated element within the member secured to the member remote from the flange and having a shoulder for engagement with the outer side of the flange.

4. A wheel rim and tire assembly according to claim 3 wherein the elongated element comprises a headed bolt or screw engaged with a screw thread provided internally of the member remote from the flange, the head of the bolt or screw engaging with the flange.

5. A wheel rim and tire assembly according to claim 3 wherein the elongated element comprises a headed plunger, the plunger head engaging with the flange.

6. A wheel rim and tire assembly according to claim 3 wherein the elongated element comprises an inflation valve stem.

7. A wheel rim and tire according to claim 3 wherein the elongated element comprises a pipe by means of which fluid may be dispensed into the cavity between the tire and wheel rim.

8. A wheel rim and tire assembly according to claim 1 wherein the tire bead retaining member is constructed of metal.

9. A wheel rim and tire assembly according to claim 1 wherein the tire bead retaining member is constructed of rubber.

10. A wheel rim and tire assembly according to claim 1 wherein a seal is provided between the flange of the tire bead retaining member and the rim.

11. A wheel rim and tire assembly according to claim 1 wherein a seal is provided between the expanded portion of the tire bead retaining member and the rim.

12. A wheel rim and tire assembly according to claim 1 comprising at least three tire bead retaining members.

13. A wheel rim and tire assembly according to claim 1 wherein the tire bead retaining member is constructed of plastics.

* * * * *